Nov. 8, 1927.
C. J. GOOSMANN
SOLDERING IRON
1,648,222
Filed Dec. 4, 1924
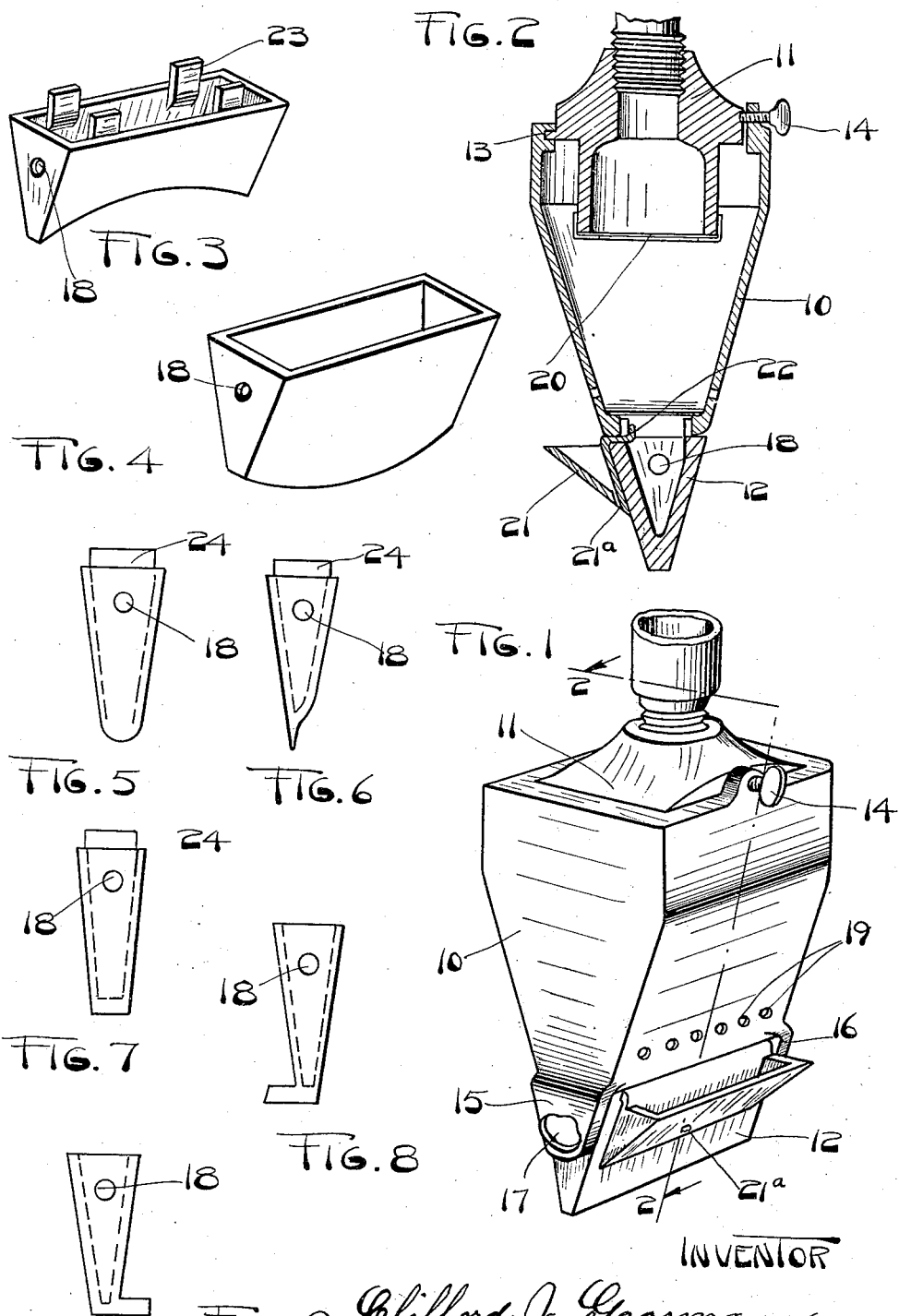
INVENTOR
Clifford J. Goosmann Patented Nov. 8, 1927.

1,648,222

UNITED STATES PATENT OFFICE.

CLIFFORD J. GOOSMANN, OF CINCINNATI, OHIO.

SOLDERING IRON.

Application filed December 4, 1924. Serial No. 753,846.

An object of my invention is to produce an improved soldering iron of the gas heated type, in which unique features of construction are employed in providing for changeability of soldering bits and other portions of my novel construction, and in which the particular shape I have designed has been especially thought out to obtain maximum efficiency in the heating of the bit with relatively small expenditure of fuel consumption and with the least possible heating of portions of the iron other than the bit.

A further object of my invention is to produce my soldering bits cheaply, by casting them in either copper, brass, steel, grey iron or the like, so that when a bit is cast in either of the metals named, it may be inserted in my improved iron, and when a bit is so inserted and heated, by applying the usual flux to the surface to be soldered, then the heated bit will heat such surface and with the usual solder applied on such heated surface, a smooth wiped surface finish is produced, but with the use of a minimum amount of solder.

A still further object is attained in the use of my improved soldering iron, in that, the usual tinning of the soldering bit is unnecessary, neither is it necessary to hammer the bit preparatory to tinning as is the custom in the use of the ordinary soldering iron.

These and other objects are attained in the soldering iron described in the following specification and illustrated in the accompanying drawing in which:

Fig. 1 is a perspective view of a soldering iron embodying my invention.

Fig. 2 is a sectional view of the iron shown in Fig. 1, and taken on the line 2—2 thereof.

Figs. 3 and 4 are perspective views of bits of modified form for use in connection with my improved soldering iron.

Figs. 5 to 9 inclusive are end elevations showing bits of modified form adapted for attachment to my improved soldering iron.

My improved soldering iron consists of a body 10 of hollow construction and having its sides tapering from an enlarged open end at the top to a relatively small open end at the bottom as shown in Fig. 2. A burner 11 is mounted in the enlarged open end of the body and a bit 12 is mounted in the small open end of the body. Burner 11 is provided with a flange 13 which engages the body 10 as shown in Fig. 2 and is held in the body by a thumb screw 14 at the opposite side of the burner. The bit is mounted to close the lower open end of the body by being located between lugs 15 and 16 extending from the body, in which thumb screws 17 are provided for engaging apertures 18 in the bit so as to hold the bit in mounted position on the body. Adjacent to the small lower end of the body, ventilation apertures 19 are provided. A burner back fire screen 20 has been provided, as is usual in burner construction.

In the several Figures 3 to 9 inclusive I have shown various forms of bits, which are shaped for particular pieces of work, such as the soldering of articles having convex surfaces, concave surfaces, and the like.

As an added feature of convenience I have provided for the attachment of a solder-holding trough 21 having a feed aperture 21ª, which may be attached to the bit by having hook-like lugs 22 engaging the interior surface of the bit. Also as an added feature the bits may be provided with lugs 23 as shown in Figs. 2 and 3 or with flanges 24 as shown in Figs. 5 to 7 inclusive, in order that they may be easily mounted in position on the open end of the iron to bring the apertures 18 into registration with those of the lugs 15 and 16 so that the thumb screws 17 may be received therein. However, if desired, the bits may be made plain as shown in Figs. 4, 8 and 9.

Among the several features of advantage attained by my improved construction is the increased efficiency of heating the iron with a minimum amount of fuel consumption because of the tapering formation of the hollow body. This is also increased because of the provision of the ventilation apertures adjacent to the bit, thus acting as flues whereby not only the products of combustion may escape, but, the tendency is to cause the flames from the burner to approach more closely into heating contact with the detachable bit. The detachability of the burner is also a feature of advantage in that the interior of the soldering iron is thereby rendered more readily accessible for cleaning and repairs.

Having thus described my invention what I claim is:

A soldering iron comprising a body of hollow rectangular tapered form having its opposite ends open, the larger of said open ends being internally grooved on one side and the smaller of said open ends having lugs extending from two of its opposite sides with vents in the remaining sides between the lugs, a burner having a lug on one side and mounted in the body groove, means on the body opposite the grooved side adapted detachably to secure the burner in the body groove, a bit at the smaller end of the body, said lugs positioning the bit between them and opposite the burner, means on the lugs adapted detachably to secure the bit in position to close the body, and a trough detachable with the bit and adjacent to the vents, adapted to feed solder to the bit and to be assisted in solder fusion by heat from the vents.

In witness whereof, I affix my signature.

CLIFFORD J. GOOSMANN.